(12) United States Patent
Crelin

(10) Patent No.: US 8,237,039 B2
(45) Date of Patent: Aug. 7, 2012

(54) ADJUSTABLE WING NUT-LESS CYMBAL MOUNT

(75) Inventor: Robert Crelin, Guilford, CT (US)

(73) Assignee: KMC Music, Inc., Bloomfield, CT (US)

( * ) Notice: Subject to any disclaimer, the term of this patent is extended or adjusted under 35 U.S.C. 154(b) by 0 days.

(21) Appl. No.: 12/890,293

(22) Filed: Sep. 24, 2010

(65) Prior Publication Data

US 2011/0072953 A1   Mar. 31, 2011

Related U.S. Application Data

(60) Provisional application No. 61/277,453, filed on Sep. 25, 2009.

(51) Int. Cl.
   *G10D 13/02* (2006.01)
(52) U.S. Cl. ........................................... 84/422.1
(58) Field of Classification Search .............. 84/421, 84/422.1, 422.2, 422.3
   See application file for complete search history.

(56) References Cited

U.S. PATENT DOCUMENTS

| | | |
|---|---|---|
| 3,336,827 A | 8/1967 | Gaylor |
| 3,994,198 A | 11/1976 | Herman |
| 4,122,750 A | 10/1978 | Rinker |
| 4,319,514 A | 3/1982 | Donohoe |
| 4,365,535 A | 12/1982 | Buttner et al. |
| 4,960,028 A | 10/1990 | Ramirez |
| 6,930,233 B2 | 8/2005 | Hsieh |
| 7,176,368 B2 | 2/2007 | Takegawa |
| 7,479,593 B1 | 1/2009 | Townsend |
| 2004/0094016 A1 | 5/2004 | Hallerberg |
| 2005/0160900 A1* | 7/2005 | Takegawa ............ 84/422.3 |

FOREIGN PATENT DOCUMENTS

GB   1105440   3/1968

OTHER PUBLICATIONS

International Search Report and Written Opinion of the International Searching Authority PCT/US2010/050356; Jan. 4, 2011; 10 pages.

* cited by examiner

*Primary Examiner* — Kimberly Lockett
(74) *Attorney, Agent, or Firm* — Hudnell Law Group P.C.

(57) ABSTRACT

An adjustable, spring-activated wing nut-less cymbal mount having a rotating stop arm that may be quickly opened and closed for easy mounting and dismounting of a cymbal and cymbal felts. The device is hand operated without tools and can be adjusted for cymbal play action, as well to better adapt to different weight cymbals. The device is self-contained to avoid misplacing parts during cymbal changeovers.

27 Claims, 3 Drawing Sheets

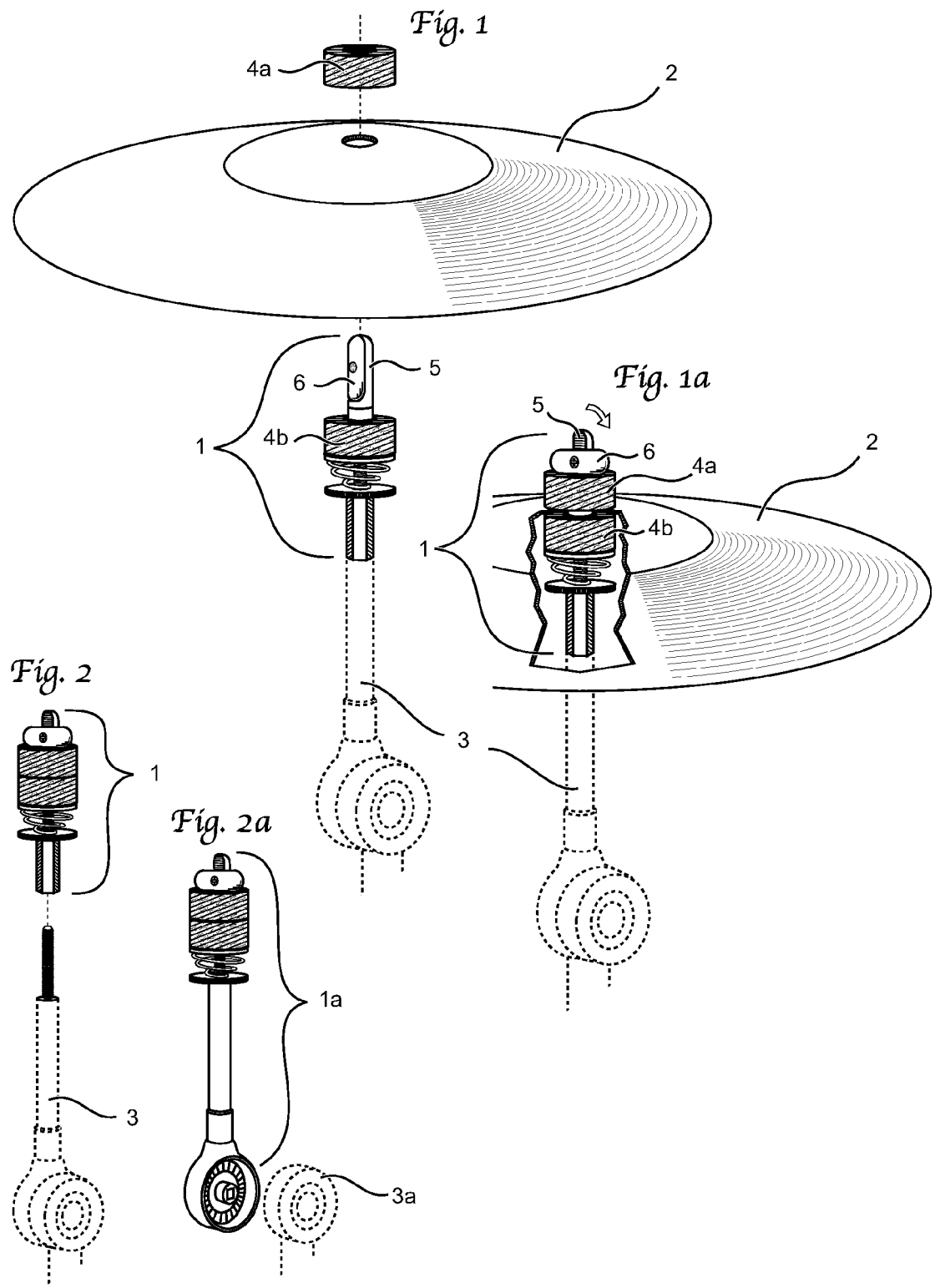

ADJUSTABLE WING NUT-LESS CYMBAL MOUNT

CROSS-REFERENCE TO RELATED APPLICATIONS

The present application claims the benefit under 35 U.S.C. §119(e) of the U.S. Provisional Patent Application Ser. No. 61/277,453, filed on Sep. 25, 2009.

FIELD OF THE INVENTION

An attachment device used for attaching a cymbal to mounting hardware, such as a cymbal stand, or other percussion hardware that allows for a quick attachment and removal of the cymbal without the need to screw on and screw off a removeable nut, such as a wing-nut.

BACKGROUND OF THE INVENTION

Musicians typically use cymbals to enhance a musical performance. Cymbals are used in many ensembles ranging from an orchestra, percussion ensembles, jazz bands, heavy metal bands, and marching groups. Drum sets or percussion hardware usually incorporate at least one cymbal, such as a stand-mounted cymbal, a suspended cymbal, as well as a pair of hi-hat cymbals into the set or hardware.

Cymbals typically consist of thin, normally round plates made form various metal alloys, however, cymbals may also be made of other materials. As part of a drum set, it is desirable to be able to quickly remove cymbals during disassembly of a drum set. For example, there are times where a person needs to be able to disassemble a drum set quickly, as time to assemble and/or disassemble a drum set may be of the essence. For example, during a musical performance, such as a rock concert for example, various musicians typically prefer to use their own instruments. Therefore, between the time when a first musical group performs and the second musical group begins their performance, the instruments of the first musical group have to be disassembled and the instruments of the second musical group have to be assembled.

There is often little time to disassemble and then reassemble a second set of instruments because patrons of the musical performance cannot wait for an inordinate amount of time for the next performance to start. Because of the inherent larger size and various components and adjustments of a drum set, the drum player's assembly and disassembly of his/her equipment requires a longer period of time when compared with the time needed for most other instruments. In the interest of patrons and other performers during scheduled performances, strict time periods and promptness are required for assembly and disassembly of drum equipment during act changes. Also, the time spent assembling and disassembling drum equipment in a recording studio is charged for as part of the hourly recording cost.

Therefore, what is desired is to provide a device for quickly attaching and/or detaching a cymbal to mounting hardware, such as a cymbal stand, or other percussion hardware that allows for a quick attachment and removal of the cymbal. This enables the instrument assembly to be replaced and allows for the smooth transition from one musical performance to another where multiple musical groups perform.

It is further desirable to provide an effective locking device for holding the cymbal in place while still facilitating the almost momentary interchangeability of cymbals.

It is also further desirable to provide a cymbal holding device which allows for a cymbal to be held between cymbal felts (also known as cymbal felt bushings) and a cymbal seat whereby pressure is placed upon the cymbal and cymbal felts, and the pressure can be controlled by adjusting a retaining member, such as a nut, which is located on a mounting member, such as a bolt. The cymbal felts and cymbal seat may be biased based upon this pressure.

Prior art references involve various designs to allow for quick removal of the cymbal, however, these designs each have their shortcomings. Prior art designs typically use a wing-nut or another such permanent attachment element.

U.S. Pat. No. 3,336,827 (Gaylor) provides a cymbal mounted on shaft having a latch that is pivotable by means of a pin. The latch may be manually rotated so that a cymbal may be mounted or removed in one position and held in a second position. Gaylor, however, does not disclose the use of multiple cymbal felts and does not disclose a spring-loaded press and release operation. The spring-loaded, press and release operation of the present invention differs from the operation of the device of Gaylor, in that Gaylor only uses lower cymbal felt bushings on stands. In addition, Gaylor does not provide adjustable spring tension that allows for weight compensation with different cymbals, or for adjusting how loose, or tight the player wishes the felt bushings to hold the cymbal.

Thus, the prior art, such as Gaylor, does not offer a design as used in the present invention that involves a rotating stop arm and adjustable spring-loaded action.

Other disadvantages of the prior art include problems when regularly inserting and dismounting the mounting hole of a cymbal over a cymbal stand or other mounting devices with square, or angular surfaces/edges, abrasion from these surfaces against the cymbal hole can cause the metal edge to wear and erode unevenly, thereby displacing the cymbal's center-of-balance when mounted.

Therefore, there is a need for a self-contained device that offers drum and percussion players an easy, adjustable and quick alternative to the standard cymbal fixation methods that does not cause wear and erosion of cymbals. Such an ideal device shall not require the unscrewing and screwing on of a removeable member to secure the cymbal and it shall accommodate most types of cymbals available.

SUMMARY OF THE INVENTION

Accordingly, it is an object of the present invention to provide a device that may achieve these objectives, namely that the device provides for a unique, quick and adjustable method for mounting and dismounting a cymbal to a cymbal stand, or percussion hardware.

It furthermore is a unique feature that the device may be made an integrated part of a cymbal stand, or percussion mounting hardware—and as well, may also be made as a complete add-on accessory that may be attached to existing stands and hardware. Both embodiments and designs are contemplated by the present invention.

It is another object of the invention to provide a solution to the problem of cymbal wear and tear which results from regularly inserting and dismounting the mounting hole of a cymbal over a cymbal stand or other mounting devices with square, or angular surfaces/edges. These angular surfaces/edges cause the abrasion against the cymbal hole that can cause the metal edge to wear and erode unevenly, thereby displacing the cymbal's center-of-balance when mounted.

In one advantageous embodiment of the present invention, when inserting and dismounting the mounting hole of a cymbal over the semi-spherical, dome- or capsule-shape of the head nut/stop arm, a universally smooth, and broad contact surface area is provided that prevents abrasion and minimizes wear to the cymbal mounting hole. Also, by nature of the shape of the semi-spherical, capsule-shape of the head nut/stop arm, the head nut/stop arm acts to immediately center the cymbal when quick mounting is desired, or if the cymbal is being mounted when visual acuity is limited, such as assembly on a darkened stage.

In one advantageous embodiment of the present invention there is a spring-activated mechanism which applies an upward pressure against the stop arm. The present design involves having the tension element, such as a spring, provide a holding force to contain the cymbal felt bushings and cymbal up against the horizontal stop arm. The upward pressure against the arm is what keeps it in the horizontal position. This acts as a locking device to prevent the cymbal and the felt bushings from coming free during play. In addition, the adjustable spring tension allows for weight compensation with different cymbals, or for adjusting how loose, or tight the player wishes the felt bushings to hold the cymbal. These elements are not taught by Gaylor or any other prior art reference.

Other objects involve biasing the tension element, so that the tension element provides the holding force to contain the cymbal felt bushings and cymbal up against the horizontal stop arm.

These and other objectives are achieved by providing a self-contained cymbal attachment device, comprising: a head nut with a non-removable, rotating stop arm, a center bolt/base assembly, upper and lower (two) felt cymbal bushings, a bushing seat, a flattenable tensioning element, such as a compression spring, and a retaining member. The retaining member may be a nut.

Other objectives of the invention are achieved by providing an assembly for mounting a cymbal to a stand comprising: a mounting member having a longitudinal axis; a retaining member having a hollow section through its longitudinal axis, the retaining member being mounted through its hollow section onto the mounting member, the retaining member being secured onto the mounting member; a tension element having a hollow section through its longitudinal axis, the tension element being mounted through its hollow section onto the mounting member, the tension element being longitudinally adjacent to the upper surface of the retaining member; a cymbal felt seat having a hollow section through its longitudinal axis, the cymbal felt seat being mounted through its hollow section onto the mounting member, the cymbal felt seat being longitudinally adjacent to the tension element, such that the tension element fits between the upper surface of the retaining member and the bottom surface of the cymbal felt seat; a top nut having a body with an upper portion and lower portion, and a stop arm fixed to the upper portion of the body via a hinge, the stop arm rotatable into an open position and a closed position, and the lower portion of the top nut having a hollow section, the lower portion of the body being retained by the cymbal felt seat and being mounted through its hollow section onto the mounting member; a first cymbal felt and a second cymbal felt, the first cymbal felt having a hollow section through its longitudinal axis and the second cymbal felt having a having a hollow section through its longitudinal axis, the first and second cymbal felts having a diameter greater than the top nut; and a cymbal having a hollow section through its longitudinal axis, wherein the first cymbal felt, the cymbal and the second cymbal felt are mounted through their hollow sections through the top nut and onto the mounting member when the stop arm is in an open position, and are retained by the cymbal felt seat, the cymbal being positioned in between the first cymbal felt and the second cymbal felt, and wherein, in the closed position, the stop arm retains and secures the first cymbal felt, the cymbal and the second cymbal felt against the cymbal felt seat, wherein the tension element is biased against the retaining member and the cymbal felt seat to secure the cymbal. This provides pressure that compresses the tension element against the retaining member to secure the cymbal.

The assembly may have the retaining member being screwed to the mounting member, such that, the retaining member is fixed into place. The retaining member may be for example a nut. In one advantageous embodiment, the mounting member may be threaded. The mounting member may comprise a threaded upper portion and a lower body that may be fixed to the stand.

The cymbal felt seat may have an upper portion for receiving the top nut and a lower portion having a surface for receiving the tension element, such that when pressure is applied the tension element compresses.

It is contemplated that in one embodiment, the first cymbal felt and the second cymbal felt may be cylindrically shaped or substantially cylindrically shaped. Additionally, the retaining member may also be cylindrically shaped or substantially cylindrically shaped.

The lower portion of the top nut may have substantially the same diameter as the combination of the upper portion and the stop arm when the stop arm is in the open position. The lower portion of the top nut may also be cylindrically shaped or substantially cylindrically shaped. When the stop arm is in the open position, the combination of the upper portion of the top nut and stop arm may form a cylindrical portion.

In still another embodiment, the upper portion of the body of the top nut may be capsule shaped or flute shaped.

While only two cymbal felts are illustrated, it is understood that the assembly may comprise additional cymbal felts, i.e. have more than two cymbal felts stacked in the assembly.

The pressure that compresses the tension element against the retaining member securing the cymbal may provide an upward pressure against the stop arm. Additionally, the pressure that compresses the tension element against the retaining member securing the cymbal may present a downward pressure against the tension element. The tension element may be compressed fully by the downward pressure.

In one embodiment, it is contemplated that the retaining member may be adjustable along the longitudinal length of the mounting member. The movement of the retaining member along the longitudinal length of the mounting member may also increase or decrease the pressure to secure the cymbal.

The assembly may be an integrated part of a percussion stand or may be provided as an add-on accessory to a percussion stand. The assembly may be detachable from the percussion stand.

Other objectives of the invention are achieved by providing a nut for receiving a cymbal, the nut comprising: a rigid body, the rigid body having a lower portion and an upper portion; and a stop arm, the stop arm rotatable to an open position and a closed position, the stop arm being attached to the upper portion of the body via a hinge; wherein when the stop arm is positioned in the open position, the stop arm and upper portion of the body combined have the same diameter as the lower portion of the rigid body.

The nut may have a hinge that allows the stop arm to rotate 90 degrees or approximately 90 degrees. There may also be a semi-circular cut out or a stop, which prevents the stop arm from rotating more than 90 degrees in either direction. Such a cut-or stop may be used to provide pressure to help lock the stop arm horizontally in the closed position.

When the nut is in the open position, the nut is configured to receive or allow removal of a cymbal, and when the nut is in the closed position, the nut retains the cymbal securely in place.

The lower portion of the body of the nut may be cylindrically shaped or substantially cylindrically shaped. The upper portion of the body of the nut may be flute shaped or capsule shaped. The hinge holding the stop arm to the upper portion of the body of the nut may be a pin, a screw or a fastener.

Other objectives of the invention are achieved by providing a method for mounting a cymbal to a stand, the method comprising the steps of: providing an assembly for mounting the cymbal to the stand, the assembly comprising: a mounting member having a longitudinal axis; a retaining member having a hollow section through its longitudinal axis, the retaining member being mounted through its hollow section onto the mounting member, the retaining member being secured onto the mounting member; a tension element having a hollow section through its longitudinal axis, the tension element being mounted through its hollow section onto the mounting member, the tension element being longitudinally adjacent to the upper surface of the retaining member; a cymbal felt seat having a hollow section through its longitudinal axis, the cymbal felt seat being mounted through its hollow section onto the mounting member, the cymbal felt seat being longitudinally adjacent to the tension element, such that the tension element fits between the upper surface of the retaining member and the bottom surface of the cymbal felt seat; a top nut having a body with an upper portion and lower portion, and a stop arm fixed to the upper portion of the body via a hinge, the stop arm rotatable into an open position and a closed position, and the lower portion of the top nut having a hollow section, the lower portion of the body are retained by the cymbal felt seat and being mounted through its hollow section onto the mounting member; rotating the stop arm to the open position; mounting the first cymbal felt through the top nut and onto cymbal felt seat; mounting the cymbal through the top nut and onto the first cymbal felt; mounting the second cymbal felt through the top nut and onto cymbal; rotating the stop arm approximately 90 degrees to secure the cymbal between the first cymbal felt and the second cymbal felt.

The step of rotating the stop arm approximately 90 degrees may provide pressure onto the first cymbal felt, cymbal and second cymbal felt.

The step of rotating the stop arm approximately 90 degrees may cause the tension element to be compressed, securing the cymbal between the first cymbal felt and the second cymbal felt.

The method may further comprise a step of rotating the retaining member to relieve the pressure upon the first cymbal felt, cymbal and second cymbal felt.

Other objectives of the invention involve mounting and dismounting of a cymbal without having to remove a fastener, like a wing nut. The head nut (top nut) may be a cylindrically-shaped member of the device and its diameter may be designed to fit inside the mounting hole of a cymbal and felt cymbal bushings when the stop arm is rotated to the open or vertical position. The separate stop arm piece forms one half of the diameter at the top section of the head nut. A fastener attaches the stop arm through its center, which acts as a pivot that the stop arm rotates freely upon. When the stop arm is rotated to the closed or horizontal position, the arm may acts as a stopper to hold the felt cymbal bushings and the cymbal in place. The lower section of the head nut, or approximately half of its length, may be covered with a thin protective layer of a synthetic material, like nylon to cushion the cymbal metal from rubbing against the main body of the head nut. The head nut screws onto the center bolt/base assembly.

Below the head nut is the bushing seat (cymbal felt seat), which is disc-shaped with a slight conical raised middle to center the felt bushing. Both felt cymbal bushings and the cymbal rest upon the top of the bushing seat, which abuts the base of the head nut. The bottom of the bushing seat is the upper surface that the compression tension element compresses against. The bushing seat has a center hole designed to fit around and freely slide up and down the center mounting member/bolt.

When mounting, or dismounting the cymbal, the flattenable compression tension element may be compressed by downward pressure applied to the upper felt bushing, thereby creating space for the stop arm to rotate to position. In addition the compression tension element may act as an adjustable shock absorber for the cymbal. The tension element sits between the upper compression surface of the bushing seat and the lower compression surface of the tension adjuster nut. The conical shape of the compression tension element allows the tension element to become flat when fully compressed.

The tension adjuster nut (retaining member) may be turned to apply more or less compression to the tension element to compensate for the different weights of various cymbals. The tension adjuster nut may be a coin-shaped, threaded nut which screws onto the center bolt/base assembly and serves as a lower compression surface for the tension element. The tension adjuster nut may have a knurled outer edge that allows it to be easily turned by fingers.

The center bolt/base assembly serves as the main attachment shaft of the device. The upper threaded bolt section of the center bolt/base assembly is what the tension adjuster nut and the head nut are threaded onto, and it is, as well, the center shaft that the tension element and bushing seat move up and down upon. Below the threaded center bolt of this assembly may either be: a permanently attached long base nut that allows the entire device to be screwed onto a threaded top of existing cymbal stand or percussion hardware. Or, in another embodiment, below the threaded bolt may instead be the coupling point where the center bolt is affixed as a permanent piece of a cymbal stand, or percussion hardware.

One advantageous embodiment of the present invention provides a self-contained cymbal fixation device, for quickly mounting and dismounting a cymbal to a stand, or to other types of percussion mounting hardware by swiveling a rotating stop arm. The stop arm may either hold or release the cymbal and cymbal felts depending on which position the arm is rotated. The device includes an adjustable compression tension element at its base that enables a retractable press-and-release function to create space for the stop arm to rotate to different positions. To support the different weights of various cymbals, the tension of the device's compression spring may be finger-adjusted, or the spring may be swapped with other weight springs. One advantageous embodiment of the present invention may be an integrated part of a cymbal stand, or as an integrated part of percussion mounting hardware. The complete device may also be an add-on cymbal mounting accessory that may be attached to existing stands and/or other hardware.

One advantageous embodiment of the present invention is an alternative to the standard cymbal fixation method and is designed to increase ease-of-use and speed when mounting and dismounting the cymbal. The standard or most common method of mounting a cymbal is by the use of a remove-able wing nut, or wing screw that acts as a holding device to keep a cymbal fixed to the top of a stand, or percussion mounting hardware. In this standard method, the wing nut or wing screw is unscrewed and temporarily removed so the cymbal may be slipped over a threaded shaft at the top of the stand/hardware. Then, the wing nut, or wing screw is screwed back on to secure the cymbal to the stand or hardware. Complaints often attributed to this standard cymbal mounting method include dropping and/or losing the removed wing nut, as well as the time spent screwing the wing nut on and off during mounting/dismounting.

Additionally, the invention is not limited to these embodiments. Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Aside from FIG. 2a, all drawings represent an add-on accessory embodiment of the invention.

FIG. 1 is a perspective view of a cymbal being mounted to the assembly of one embodiment of the present invention, where the cymbal is attached to the top of a stand;

FIG. 1a is an perspective view of FIG. 1, showing a cymbal mounted to the assembly of one embodiment of the present invention;

FIG. 2 is an perspective view showing the add-on accessory of an embodiment of the present invention;

FIG. 2a is an perspective view showing the integrated stand/hardware embodiment of one embodiment of the present invention;

DETAILED DESCRIPTION OF THE INVENTION

Figure 3:
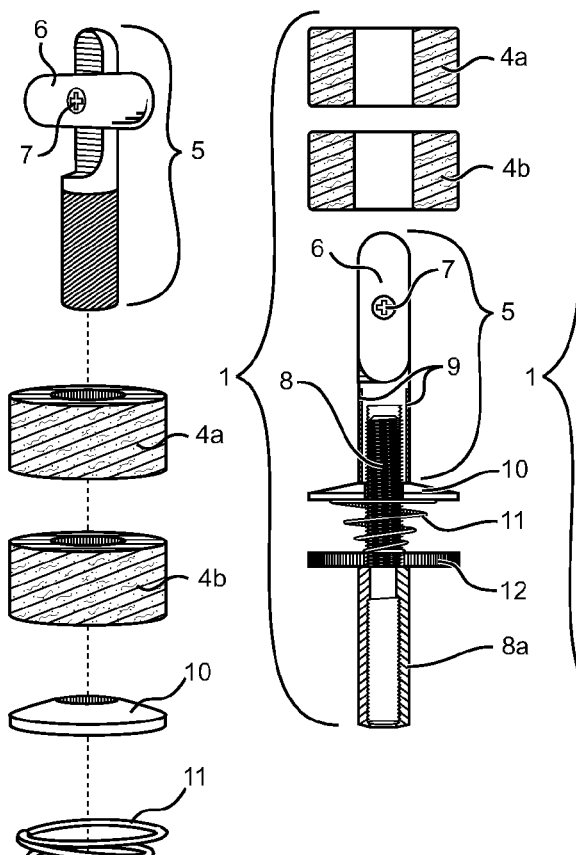
FIG. 3 is a exploded view of an embodiment of the present invention showing the individual components of the assembly.

Referring to FIG. 1, this perspective view shows the adjustable wing nut-less cymbal mount assembly 1 attached to the top tilter section 3 of a cymbal stand. This illustration depicts the open, or vertical position of the stop arm 6 that allows the cymbal 2 and upper cymbal felt bushing 4a to slide over the head nut (top nut) 5 onto the lower cymbal felt bushing 4b of the device. The combined illustrations of FIG. 1 and FIG. 1a depict a basic overview of the procedure for mounting and fixing a cymbal 2 to the assembly 1. A more detailed illustration of the procedure is depicted in FIGS. 4 through 12. FIG. 1 and FIG. 1a show in broken line form element 3, that the assembly may be connected to a percussion stand or to various mounts. The invention involves the assembly being integrated into a cymbal or percussion stand and also involves the assembly being a part of an add-on to a cymbal or percussion stand.

FIG. 1a is a perspective view showing the cymbal 2 mounted and fixed to the assembly 1. The cutaway view of the cymbal 2 allows a complete view of the mounted cymbal fixed in place between the upper 4a and lower 4b cymbal felt bushings, and secured by the stop arm 6, which is now rotated in the closed or horizontal position.

FIG. 2 is a perspective view showing the assembly 1 as an add-on accessory embodiment that may be screwed onto an existing cymbal stand 3, or onto other percussion hardware.

FIG. 2a is a perspective view showing the assembly 1a in an optional embodiment as an integrated part of a cymbal stand tilter that may be a permanent piece of a cymbal stand 3a, or other percussion hardware.

FIG. 3 is an exploded perspective view showing the individual parts of the invention, comprised of: the head nut (top nut) 5 and the rotating stop arm 6 which are both joined together by a fastener/pivot/hinge 7, the upper cymbal felt bushing 4a, and lower cymbal felt bushing 4b, the bushing seat 10, the compression spring 11, the tension adjuster nut 12 and the center bolt 8 and base assembly 8a.

Figure 3A:
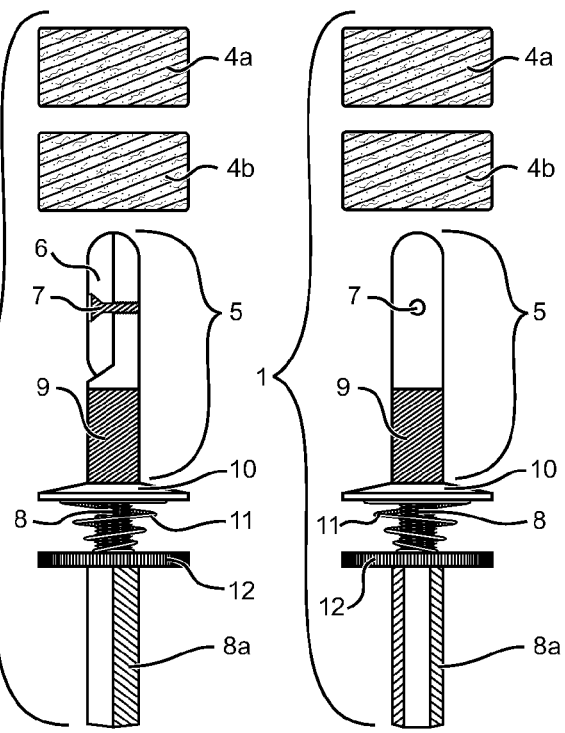
FIG. 3a shows rotated side views of an embodiment of the assembled present invention, in the open position, showing a transparent front, lateral and rear view.

FIG. 3a is a series of three rotated side views of the assembly, showing from left to right, a front, lateral and rear view. All three views in FIG. 3a depict the stop arm 6 rotated in the open, or vertical position where the upper and lower cymbal felt bushings 4a, 4b are dismounted and above the head nut. The leftmost or front view drawing depicts a transparent view to better illustrate the connecting relationship of the assembly parts. The head nut 5 is shown as internally threaded from the opening at its bottom, and the bolt of the bolt/base assembly 8 is screwed inside the head nut 5. In the add-on accessory embodiment of the invention, as shown here, the base assembly 8a is shown internally threaded from the opening at its bottom, which allows the invention to be screwed onto an existing stand or percussion hardware. The head nut as shown has internal threading, and is preferred to have internal threading, though some embodiments may provide a head nut without internal threading. In the integrated embodiment of the invention, as shown in FIG. 2a, a part of an existing stand, or hardware would instead be in place of the base assembly 8a. The parts indicated on all three views are comprised of: the head nut 5, and the stop nut 6, which are shown here rotated to the open or vertical position. The fastener or hinge 7 attaches the stop nut to the head nut and acts a pivot for the stop nut to freely rotate upon. A protective synthetic layer 9 may surround the lower section of the head nut to cushion the contact between the cymbal and the head nut. The bushing seat 10, acts as a holder on which the lower felt bushings 4b rests, and it is shown as slightly conical in shape to help to center the felt bushing. The bottom of the bushing seat 10 also acts as the upper contact surface of the compression spring 11, which the spring compresses against when the cymbal bushings are depressed to rotate the stop arm 6. The compression and expansion of the compression spring 11 allows the cymbal, the felt cymbal bushings 4a, 4b and the bushing seat 10 to move up and down the head nut and the center bolt 8 when downward pressure is applied, and when it is released. The tension adjuster nut 12 is threaded onto the center bolt 8 and it acts as the lower contact surface for the compression spring 11. When turned up, or down the center bolt 8, the tension adjuster nut 12 increases, or decreases tension respectively on the compression spring 11, which may raise the mounted cymbal, or compensate for the added weight of heavier cymbals.

Figure 3B:
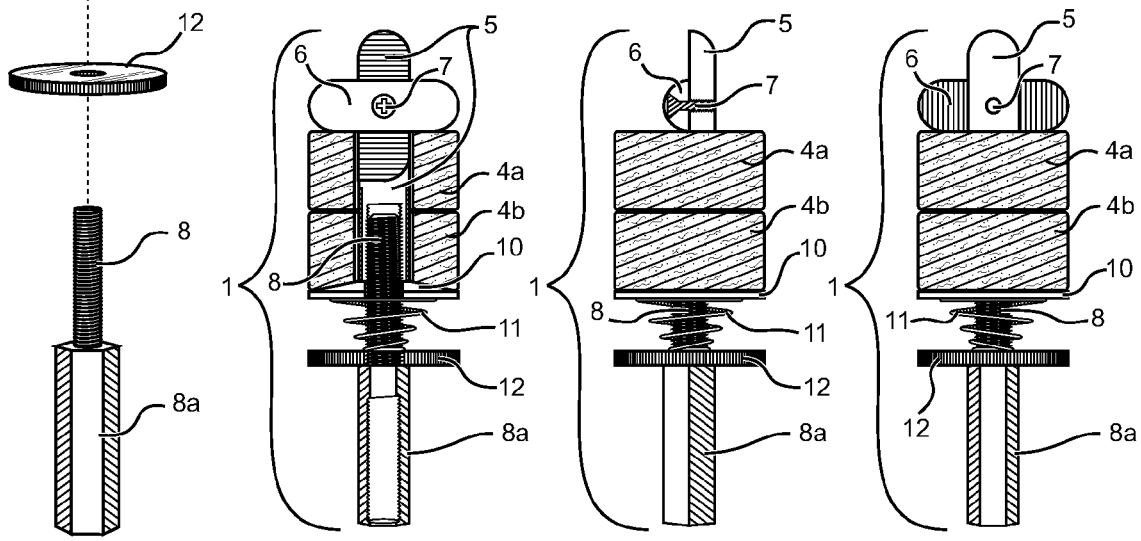
FIG. 3b shows rotated side views of one embodiment of the assembled present invention, in the closed position, showing a transparent front, lateral and rear view.

FIG. 3b is a series of three rotated side views of the invention, showing from left to right, a front, lateral and rear view. All three views in FIG. 3b depict the stop arm 6 rotated in the closed, or horizontal position and the upper and lower cymbal bushings 4a, 4b are installed. The leftmost or front view drawing depicts a transparent view to better illustrate the connecting relationship of the invention parts. All of the individual parts and descriptions are the same as the preceding paragraph describing FIG. 3*a*, except for the following additional information: As depicted in all drawings of FIG. 3*b*, when the stop arm 6 is rotated to the closed, or horizontal position, it acts a stopper that holds both felt cymbal bushings 4*a*, 4*b* in place between the stop arm 6 and the bushing seat 10. The compression spring 11 provides upward pressure against the bushing seat 10, which in turn holds the felt cymbal bushings 4*a*, 4*b* against the horizontally positioned stop arm 6 above. When a cymbal is added to the invention, as shown in the mounting procedure depicted in FIGS. 4 through 12, the same pressure between the compression spring 11 and the closed stop arm 6 acts as the retainer that holds the cymbal in place.

Figure 4:
FIGS. 4 to 12 are a sequence of side views of an embodiment of the present invention showing the cymbal mounting procedure and how to adjust it.
Figure 10:
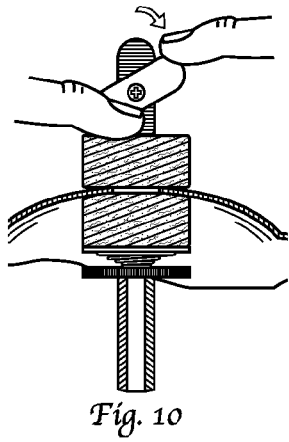
Figure 11:
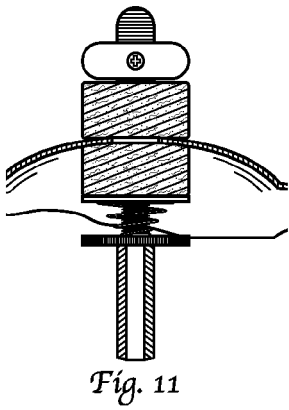
Figure 12:
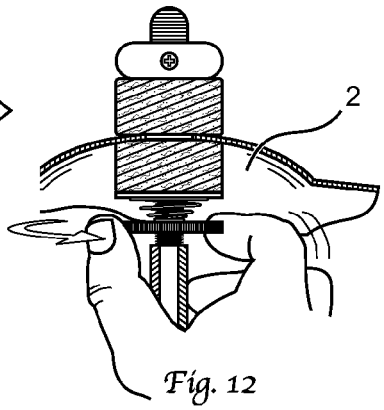

FIGS. 4 through 12 are a series of drawings of the invention, as seen from the same frontal view. This sequence of drawings, from FIG. 4 through FIG. 11 shows the cymbal mounting procedure in eight steps. FIG. 12 illustrates the adjustment of the compression spring using the tension adjuster nut. The subsequent dismounting of the cymbal from the invention would be this same sequence followed in reverse, starting with FIG. 11 and following the figure drawings backwards to FIG. 4. The action shown in each Figure is described as follows:

FIG. 4 shows the invention in the closed position, with the felt cymbal bushings retained by the horizontal stop arm.

Figure 5:
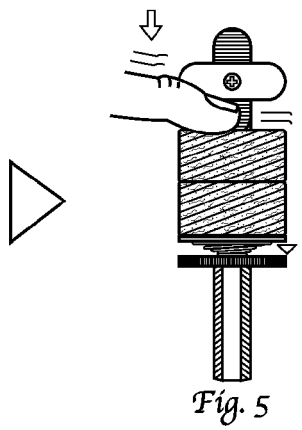

FIG. 5 shows the hand-applied downward pressure on both felt cymbal bushings, which compresses the compression spring and creates ample space above the upper cymbal bushing to rotate the stop arm.

Figure 6:
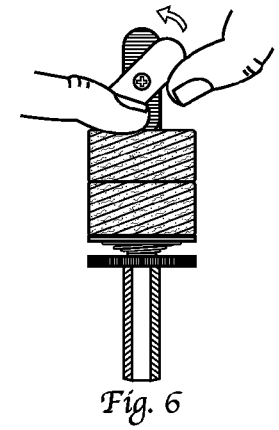

FIG. 6 shows that, while the downward pressure is being applied to the cymbal bushings, the stop arm may be freely rotated to the open or vertical position.

Figure 7:
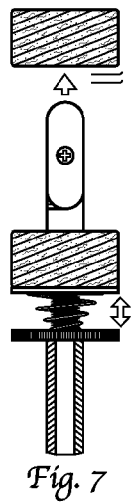

FIG. 7 shows that once the stop arm is positioned to the open or vertical position, the upper cymbal bushing may be slid over the top of the head nut and off of the invention.

Figure 8:
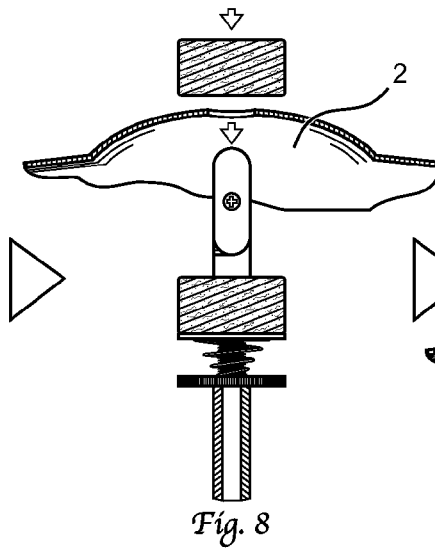

FIG. 8 shows the top of the head nut being inserted through the center mounting hole of a cymbal 2 (or, the cymbal 2 being slid onto the head nut) and then down to rest on the lower cymbal bushing. The previously removed upper cymbal bushing is then also slid onto the head nut and down to rest on the top of the cymbal 2.

Figure 9:
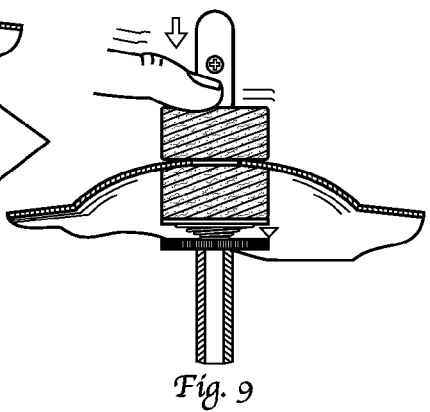

FIG. 9 shows the downward pressure, hand-applied again on both felt cymbal bushings and the cymbal 2, which compresses the compression spring and creates ample space above the upper cymbal bushing to rotate the stop arm.

FIG. 10 shows that, while the downward pressure being applied to the cymbal bushings and cymbal, the stop arm may be freely rotated to the closed or horizontal position.

FIG. 11 shows that once the stop arm is set in the closed or horizontal position and the downward pressure is released, the upward pressure from the expansion of the compression spring below holds the cymbal 2 and felt cymbal bushings in place, mounted and ready to play.

FIG. 12 shows how, when the cymbal 2 is mounted on the invention, the tension adjuster nut may be turned to increase, or decrease the tension of the compression spring. By increasing the tension, or winding the tension adjuster nut higher up the center bolt, this may raise the cymbal higher and compensate for the added weight of the cymbal.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. An assembly for mounting a cymbal to a stand comprising:
    a mounting member having a longitudinal axis;
    a retaining member having a hollow section through its longitudinal axis, the retaining member being mounted through its hollow section onto the mounting member, the retaining member being attached onto the mounting member;
    a tension element having a hollow section through its longitudinal axis, the tension element being mounted through its hollow section onto the mounting member, the tension element being longitudinally adjacent to the upper surface of the retaining member;
    a cymbal felt seat having a hollow section through its longitudinal axis, the cymbal felt seat being mounted through its hollow section onto the mounting member, the cymbal felt seat being longitudinally adjacent to the tension element, such that the tension element fits between the upper surface of the retaining member and the bottom surface of the cymbal felt seat;
    a top nut having a body with an upper portion and lower portion, and a stop arm fixed to the upper portion of the body via a hinge, the stop arm rotatable into an open position and a closed position, and the lower portion of the top nut having a hollow section, the lower portion of the body are retained by the cymbal felt seat and being mounted through its hollow section onto the mounting member;
    a first cymbal felt and a second cymbal felt, the first cymbal felt having a hollow section through its longitudinal axis and the second cymbal felt having a having a hollow section through its longitudinal axis, the first and second cymbal felts having a diameter greater than the top nut; and
    a cymbal having a hollow section through its longitudinal axis,
    wherein the first cymbal felt, the cymbal and the second cymbal felt are mounted through their hollow sections through the top nut and onto the mounting member when the stop arm is in an open position, and are retained by the cymbal felt seat, the cymbal being positioned in between the first cymbal felt and the second cymbal felt, and
    wherein, in the closed position, the stop arm retains and secures the first cymbal felt, the cymbal and the second cymbal felt against the cymbal felt seat, wherein the tension element is biased against the retaining member and the cymbal felt seat to secure the cymbal.

2. The assembly of claim 1, wherein the retaining member is screwed to the mounting member such that the retaining member is fixed into place.

3. The assembly of claim 1, wherein the retaining member is a tension nut.

4. The assembly of claim 1, wherein the mounting member is threaded.

5. The assembly of claim 1, wherein the mounting member comprises a threaded upper portion and a lower body that are fixed to the stand.

6. The assembly of claim 1, wherein the cymbal felt seat has an upper portion for receiving the top nut and a lower portion having a surface for receiving the tension element, such that when pressure, is applied the tension element compresses.

7. The assembly of claim 1, wherein both the first cymbal felt and the second cymbal felt are substantially cylindrically shaped.

8. The assembly of claim 1, wherein the retaining member is substantially cylindrically shaped.

9. The assembly of claim 1, wherein the lower portion of the top nut has the same diameter as the combination of the upper portion and the stop arm.

10. The assembly of claim 1, wherein the assembly comprises more than two cymbal felts.

11. The assembly of claim 1, wherein upper portion of the body of the top nut is capsule shaped.

12. The assembly of claim 1, wherein the pressure that compresses the tension element against the retaining member securing the cymbal presents an upward pressure against the stop arm.

13. The assembly of claim 1, wherein the pressure that compresses the tension element against the retaining member securing the cymbal presents a downward pressure against the tension element.

14. The assembly of claim 13, wherein the tension element is compressed by the downward pressure.

15. The assembly of claim 1, wherein the retaining member is adjustable along the longitudinal length of the mounting member.

16. The assembly of claim 15, wherein the movement of the retaining member along the longitudinal length of the mounting member acts to increase or decrease pressure to secure the cymbal.

17. A nut for receiving a cymbal, the nut comprising:
   a rigid body, the rigid body having a lower portion and an upper portion; and
   a stop arm, the stop arm rotatable to an open position and a closed position, the stop arm being attached to the upper portion of the body via a hinge;
   wherein when the stop arm is positioned in the open position, the stop arm and upper portion of the body combined have the same diameter as the lower portion of the rigid body,
   wherein the upper portion of the body has a capsule shaped portion and wherein the upper portion of the body has a semi-circular cut, the semi-circular cut preventing the stop arm from rotating more than 90 degrees.

18. The nut of claim 17, wherein the hinge allows the stop arm to rotate to approximately 90 degrees.

19. The nut of claim 17, wherein when the nut is in the open position, the nut may receive a cymbal, and when the nut is in the closed position, the nut may retain the cymbal.

20. The nut of claim 17, wherein the lower portion of the body is substantially cylindrically shaped.

21. The nut of claim 17, wherein the hinge is a pin.

22. A method for mounting a cymbal to a stand, the method comprising the steps of:
   providing an assembly for mounting the cymbal to the stand, the assembly comprising:
      a mounting member having a longitudinal axis;
      a retaining member having a hollow section through its longitudinal axis, the retaining member being mounted through its hollow section onto the mounting member, the retaining member being secured onto the mounting member;
      a tension element having a hollow section through its longitudinal axis, the tension element being mounted through its hollow section onto the mounting member, the tension element being longitudinally adjacent to the upper surface of the retaining member;
      a cymbal felt seat having a hollow section through its longitudinal axis, the cymbal felt seat being mounted through its hollow section onto the mounting member, the cymbal felt seat being longitudinally adjacent to the tension element, such that the tension element fits between the upper surface of the retaining member and the bottom surface of the cymbal felt seat;
      a top nut having a body with an upper portion and lower portion, and a stop arm fixed to the upper portion of the body via a hinge, the stop arm rotatable into an open position and a closed position, and the lower portion of the top nut having a hollow section, the lower portion of the body being retained by the cymbal felt seat and being mounted through its hollow section onto the mounting member;
   rotating the stop arm to the open position;
   mounting the first cymbal felt through the top nut and onto cymbal felt seat;
   mounting the cymbal through the top nut and onto the first cymbal felt;
   mounting the second cymbal felt through the top nut and onto cymbal;
   rotating the stop arm approximately 90 degrees to secure the cymbal between the first cymbal felt and the second cymbal felt.

23. The method of claim 22, wherein the step of rotating the stop arm approximately 90 degrees provides pressure onto the first cymbal felt, cymbal and second cymbal felt.

24. The method of claim 22, wherein the step of rotating the stop arm approximately 90 degrees causes the tension element to be compressed, securing the cymbal between the first cymbal felt and the second cymbal felt.

25. The method of claim 23, further comprising rotating the retaining member to relieve the pressure upon the first cymbal felt, cymbal and second cymbal felt.

26. The assembly of claim 1, wherein the assembly is an integrated part of a percussion stand.

27. The assembly of claim 1, wherein the assembly is detachable from a percussion stand.

* * * * *